(12) United States Patent (10) Patent No.: US 12,613,496 B2

Hisai (45) Date of Patent: Apr. 28, 2026

(54) ATOMIC CLOCK SYSTEM AND FREQUENCY STABILIZATION DEVICE

(71) Applicant: SHIMADZU CORPORATION, Kyoto (JP)

(72) Inventor: Yusuke Hisai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 18/912,412

(22) Filed: Oct. 10, 2024

(65) Prior Publication Data

US 2025/0123595 A1 Apr. 17, 2025

(30) Foreign Application Priority Data

Oct. 12, 2023 (JP) ................................. 2023-176676

(51) Int. Cl.
| | |
|---|---|
| *G04F 5/14* | (2006.01) |
| *H01S 3/00* | (2006.01) |
| *H01S 3/10* | (2006.01) |
| *H01S 3/13* | (2006.01) |

(52) U.S. Cl.
CPC .............. *G04F 5/14* (2013.01); *H01S 3/0078* (2013.01); *H01S 3/10053* (2013.01); *H01S 3/1305* (2013.01)

(58) Field of Classification Search
CPC ........................................................ G04F 5/14

USPC ........................................................ 331/94.1
See application file for complete search history.

(56) References Cited

U.S. PATENT DOCUMENTS

2023/0350130 A1* 11/2023 Davila-Rodriguez ...................... G01B 9/02004
2024/0369895 A1* 11/2024 Li ............................ G02F 1/21

OTHER PUBLICATIONS

Long-Sheng Ma et al., "Delivering the same optical frequency at two places: accurate cancellation of phase noise introduced by an optical fiber or other time-varying path," Optics Letters vol. 19, Issue 21, Nov. 1, 1994, pp. 1777-1779.
Tomoya Akatsuka et al., "30-km-long optical fiber link at 1397nm for frequency comparison between distant strontium optical lattice clocks," Japanese Journal of Applied Physics, vol. 53 , No. 3, No. 032801, Feb. 5, 2014.

* cited by examiner

*Primary Examiner* — Joseph Chang
(74) *Attorney, Agent, or Firm* — Muir Patent Law, PLLC

(57) ABSTRACT

An atomic clock system comprises: a laser light source that outputs first laser light; a first atomic clock; a first optical modulator; a second optical modulator that receives laser light from the first optical modulator through an optical fiber, a reflection mechanism; a second atomic clock; a first frequency stabilization device; and a second frequency stabilization device.

5 Claims, 6 Drawing Sheets

FIG.3

ATOMIC CLOCK SYSTEM AND FREQUENCY STABILIZATION DEVICE

CROSS REFERENCE TO RELATED APPLICATIONS

This nonprovisional application is based on Japanese Patent Application No. 2023-176676 filed on Oct. 12, 2023 with the Japan Patent Office, the entire contents of which are hereby incorporated by reference.

BACKGROUND OF THE INVENTION

Field of the Invention

The present disclosure relates to an atomic clock system and a frequency stabilization device.

Description of the Background Art

Conventionally, a variety of types of atomic clocks have been utilized to count time with high precision. For example, there is known an example in which two atomic clocks placed at different locations are used to conduct an experiment to verify general relativity. As in such an experiment, in a scene with two atomic clocks utilized, the two atomic clocks are interconnected with an optical fiber for transmitting laser light.

In general, when laser light is transmitted through an optical fiber, a noise is superimposed on the laser light as the optical fiber expands and contracts and accordingly an optical path varies in length, and the optical fiber vibrates, etc. Such a noise is referred to as fiber noise. Laser light which is not required to have a high degree of stability in frequency scarcely has a problem with fiber noise. However, when a laser light having a narrow line width that requires a line width of several kHz or less is transmitted, an effect of fiber noise on communications is not negligible.

Accordingly, conventionally, a technique of removing fiber noise by a technique called fiber noise cancellation (FNC) is known. The FNC is a method in which light having noise superimposed thereon as the light passes through an optical fiber is partially returned toward the light source to cancel a noisy component through feedback control. For example, L.-S. Ma, P. Jungner, J. Ye, and J. L. Hall, "Delivering the same optical frequency at two places: accurate cancellation of phase noise introduced by an optical fiber or other time-varying path", Opt. Lett. 19, 1777-1779 (1994) describes FNC technology. Tomoya Akatsuka, Hitomi Ono, Keitaro Hayashida, Kuniya Araki, Masao Takamoto, Tetsushi Takano, and Hidetoshi Katori, "30-km-long optical fiber link at 1397 nm for frequency comparison between distant strontium optical lattice clocks", Jpn. J. Appl. Phys. 53, 032801 (2014) describes an example of using the FNC when transmitting highly stable laser light through a long-distance optical fiber.

SUMMARY OF THE INVENTION

In general, when laser light is transmitted through an optical fiber over a long distance, a large delay time is introduced after the laser light is output from the light source before the laser light is returned at a destination and returns to a location where feedback control is performed. For this reason, the FNC method has a problem in that the method cannot cancel a high-frequency component of a noise when laser light is transmitted through an optical fiber over a long distance. In that case, a laser light having a narrow line width cannot be obtained at the destination of the laser light. As a result, there arises a problem, that is, time cannot be suitably observed in a scene where a plurality of atomic clocks connected by an optical fiber are used to observe time.

The present disclosure has been made in order to solve the above-described problem, and an object of the present disclosure is to enable suitably observing time in a scene where a plurality of atomic clocks connected by an optical fiber are used to observe time.

The present disclosure relates to an atomic clock system. The atomic clock system comprises: a laser light source that outputs first laser light; a first atomic clock that operates using the first laser light; a first optical modulator that receives the first laser light; a second optical modulator that receives laser light from the first optical modulator through an optical fiber; a reflection mechanism that is disposed on an optical path between the optical fiber and the second optical modulator, and reflects a portion of laser light traveling through the optical fiber toward the second optical modulator to return the portion of the laser light to the optical fiber as feedback light; a second atomic clock that operates using second laser light output from the second optical modulator; a first frequency stabilization device disposed to configure a negative feedback circuit on an optical path between the laser light source and the first optical modulator; and a second frequency stabilization device disposed to configure a negative feedback circuit on an optical path between the second optical modulator and the second atomic clock, wherein the first frequency stabilization device uses the first laser light and the feedback light to remove fiber noise superimposed on the first laser light, and the second frequency stabilization device removes a noise of a high-frequency component superimposed on the second laser light.

The present disclosure relates to a frequency stabilization device that stabilizes a frequency of laser light output from an output device. The frequency stabilization device comprises: a phase modulation device that modulates a phase of the laser light output from the output device using a modulation signal; an optical resonator that resonates the laser light modulated by the phase modulation device; a photodetector that detects laser light output from the optical resonator; a phase comparator that calculates a comparison value between a detection signal of the photodetector and the modulation signal; a filter circuit that extracts an error signal including an error of a high-frequency component from the comparison value; and an adjustment circuit that uses the error signal extracted by the filter circuit to adjust the frequency of the laser light output from the output device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a conceptual diagram of an optical grating.

DESCRIPTION OF THE PREFERRED EMBODIMENTS

Hereinafter, an embodiment of the present disclosure will be described in detail with reference to the drawings. In the figures, identical or corresponding components are identically denoted and will not be described repeatedly.

Figure 1:
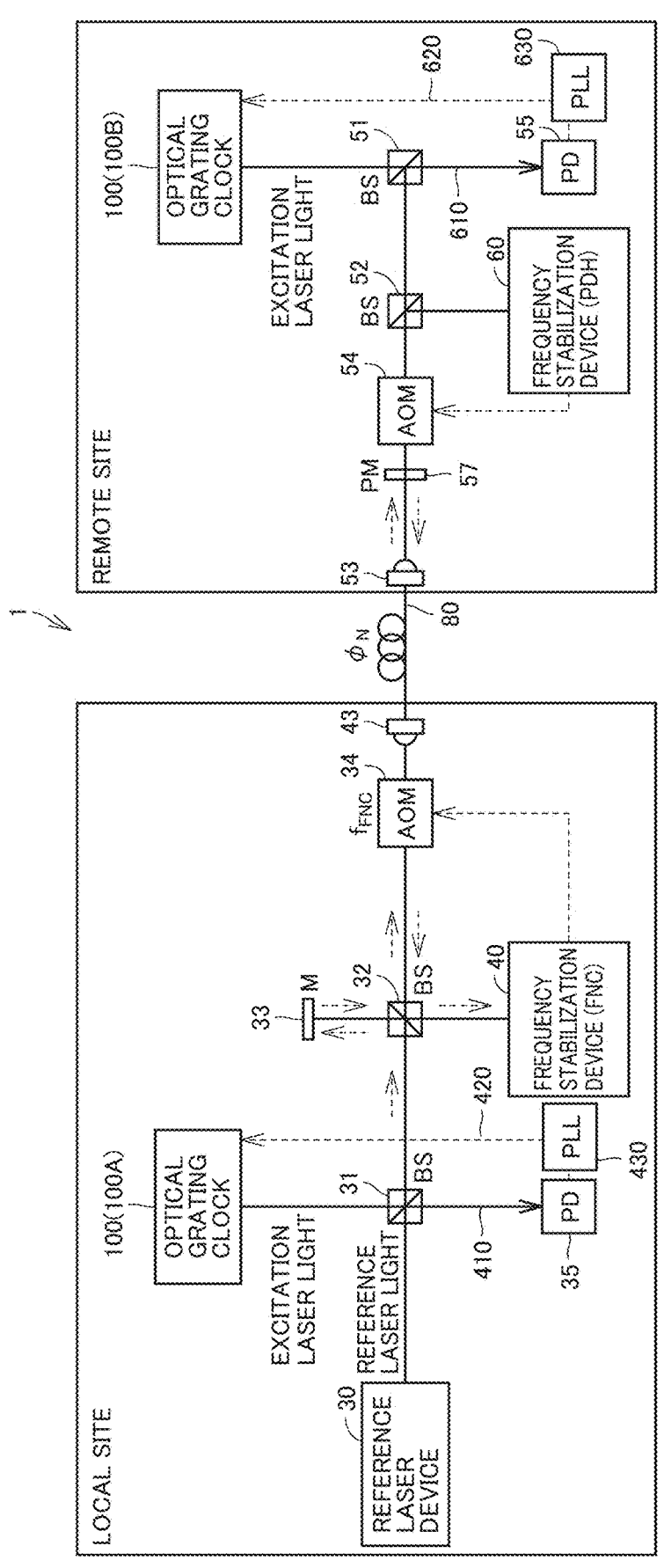
FIG. 1 is a block diagram showing a configuration of an atomic clock system according to an embodiment.

FIG. 1 is a block diagram showing a configuration of an atomic clock system 1 according to an embodiment. FIG. 1 shows a configuration in which a local site and a remote site are connected by an optical fiber for transmitting laser light. An optical grating clock 100 is disposed at each of the local site and the remote site. Optical grating clock 100 is an example of an atomic clock. Hereinafter, the optical grating clock disposed at the local site may be referred to as an optical grating clock 100A, and the optical grating clock disposed at the remote site may be referred to as an optical grating clock 100B.

The configuration shown in FIG. 1 is used, for example, in an experiment in which a measurement value of optical grating clock 100A located at the local site is compared with a measurement value of optical grating clock 100B located at the remote site. The local site and the remote site are connected by an optical fiber 80 laid over a distance of several tens kilometers or more, for example. At the local site, optical fiber 80 has an end connected to an optical connector 43, and at the remote site, optical fiber 80 has an end connected to an optical connector 53.

At the local site, in addition to optical grating clock 100A, there are disposed a reference laser device 30, beam splitters (BSs) 31 and 32, a mirror 33, an acousto-optic modulator (AOM) 34, a photodiode (PD) 35, a frequency stabilization device 40, and a PLL (Phase Locked Loop) circuit 430. Frequency stabilization device 40 stabilizes reference laser light having a narrow line width in frequency with high precision based on the FNC (Fiber Noise Cancellation) method. The FNC is a method in which light having noise superimposed thereon as the light passes through an optical fiber is partially returned toward the light source to cancel a noisy component through feedback control.

At the remote site, in addition to optical grating clock 100B, there are disposed beam splitters (BSs) 51 and 52, an acousto-optic modulator (AOM) 54, a photodiode (PD) 56, a partial reflection mirror (PM) 57, a frequency stabilization device 60, and a PLL circuit 630. A PDH (Pound-Drever-Hall) method is applied to frequency stabilization device 40. The PDH method is a method of frequency stabilization of laser light with respect to an optical resonator.

Reference laser device 30 outputs reference laser light, which is in turn transmitted to the remote site via long-distance optical fiber 80, and has an increased high-frequency noise component that cannot be removed by the FNC method. In order to remove such a high-frequency noise component at the remote site, frequency stabilization device 40 is additionally provided with a novel configuration that has not been employed in a conventionally known PDH method. Frequency stabilization device 60 stabilizes the reference laser light in frequency with high precision based on the configuration with the PDH method applied thereto.

(Local Site)

Reference laser device 30 outputs reference laser light having a narrow line width. The reference laser light has a line width for example of several kHz or less. Reference laser device 30 is an example of a laser light source. The reference laser light is an example of a first laser light. Beam splitter 31 splits the reference laser light into two and causes them to be incident on photodiode 35 and beam splitter 32.

Incident on photodiode 35 are the reference laser light, and in addition, excitation laser light from optical grating clock 100A through beam splitter 31. Photodiode 35 detects a beat of light of the reference laser light and the excitation laser light synthesized together. Photodiode 35 is an example of a photodetector. Photodiode 35 outputs an electrical signal corresponding to intensity of laser light.

Between optical grating clock 100A and photodiode 35, there are provided a path 410 for causing photodiode 35 to receive the reference laser light and the excitation laser light, and a path 420 on which a PLL (Phase Locked Loop) circuit 430 is disposed. PLL circuit 430 synchronizes the phase of the excitation laser light received from optical grating clock 100A with the phase of the reference laser light by a phase locked loop. The phase locked loop stabilizes a beat frequency. A signal for stabilizing the beat frequency is fed back to optical grating clock 100A via path 420.

Beam splitter 32 receives laser light from beam splitter 31, splits the received laser light into two, and causes them to be incident on mirror 33 and acousto-optic modulator 34. Acousto-optic modulator 34 outputs laser light to optical fiber 80. Acousto-optic modulator 34 is an example of a first optical modulator. Optical fiber 80 transmits the reference laser light from the local site to the remote site.

The reference laser light, rather than the excitation laser light, is transmitted from the local site to the remote site because transmitting the excitation laser light through an optical fiber over a long distance would increase loss of power. This is because the excitation laser light has a wavelength band in the visible band. For the reference laser light, an infrared wavelength band such as a communication wavelength band is often used. The reference laser light has small power loss when the light is transmitted through an optical fiber over a long distance, and it can be said to be a communication medium suitable for long-distance transmission.

(Remote Site)

The laser light transmitted to the remote site through optical fiber 80 is incident on a partial reflection mirror 57. Partial reflection mirror 57 reflects a portion of the incident light. The reflection of the laser light returns to the local site through optical fiber 80 as feedback light. The laser light having passed through partial reflection mirror 57 is incident on acousto-optic modulator 54. Acousto-optic modulator 54 is an example of a second optical modulator. Acousto-optic modulator 54 outputs the laser light which is in turn incident on beam splitter 52. Beam splitter 52 receives a beam of light from acousto-optic modulator 54, splits the beam of light into two, and causes them to incident on beam splitter 51 and frequency stabilization device 60.

Beam splitter 51 receives laser light from beam splitter 52 and causes the received laser light to incident on photodiode 55. Incident on photodiode 55 are laser light from acousto-optic modulator 54, and in addition, excitation laser light from optical grating clock 100B through beam splitter 51.

Paths 610 and 620 corresponding to paths 410 and 420 of the local site are provided between optical grating clock 100B and photodiode 55. A PLL circuit 630 corresponding to PLL circuit 430 of the local site is disposed on path 620.

PLL circuit 630 synchronizes the phase of the excitation laser light received from optical grating clock 100B with the phase of the laser light output from acousto-optic modulator 54 by a phase locked loop. The phase locked loop stabilizes a beat frequency. A signal for stabilizing the beat frequency is fed back to optical grating clock 100B via path 620. Laser light output from acousto-optic modulator 54 is an example of a second laser light.

(Significance of Frequency Stabilization Devices 40 and 60)

For synchronization between optical grating clock 100A and optical grating clock 100B, the reference laser light output from reference laser device 30 must be split into two and thus used by both optical grating clock 100A disposed at the local site and optical grating clock 100B disposed at the remote site.

This requires transmitting the reference laser light from the local site to the remote site through optical fiber 80. Optical fiber 80 transmits from the local site to the remote site a portion of the reference laser light output from reference laser device 30. A fiber noise φN is superimposed on the reference laser light transmitted through optical fiber 80. Accordingly, the FNC method is applied to frequency stabilization device 40 that is disposed at the local site to remove fiber noise φN by frequency stabilization device 40.

However, when laser light is transmitted through optical fiber 80 over a long distance, a noise of a high-frequency component which cannot be removed by the FNC method increases. Such a noise of a high-frequency component has a negative effect on spectral processing of optical grating clock 100B at the remote site.

As a solution for this, apart from frequency stabilization device 40 disposed at the local site, a system that removes noise may be introduced in the remote site. However, if noises of low- and high-frequency components are all removed at the remote site, reference laser light stabilized in frequency at the local site and reference laser light stabilized in frequency at the remote site separately from the local site will no longer be identical. This is because a process for removing the noise of the low-frequency component is performed at the local site and the remote site separately.

Accordingly, in the present embodiment, frequency stabilization device 40 that removes fiber noise (a noise of a low-frequency component) of reference laser light is disposed at the local site, and frequency stabilization device 60 that removes a noise of a high-frequency component that cannot be removed by the FNC method is disposed at the remote site. It should be noted, however, that frequency stabilization device 60 is not provided with a function of removing the fiber noise (the noise of the low-frequency component).

Thus, letting frequency stabilization device 40 located at the local site process the noise of the low-frequency component of the reference laser light allows the remote site to obtain laser light (second laser light) that is ensured to be identical to the reference laser light (first laser light) used in the local site while removing the noise of the high-frequency component increasing as the light is transmitted over a long distance.

Figure 2:
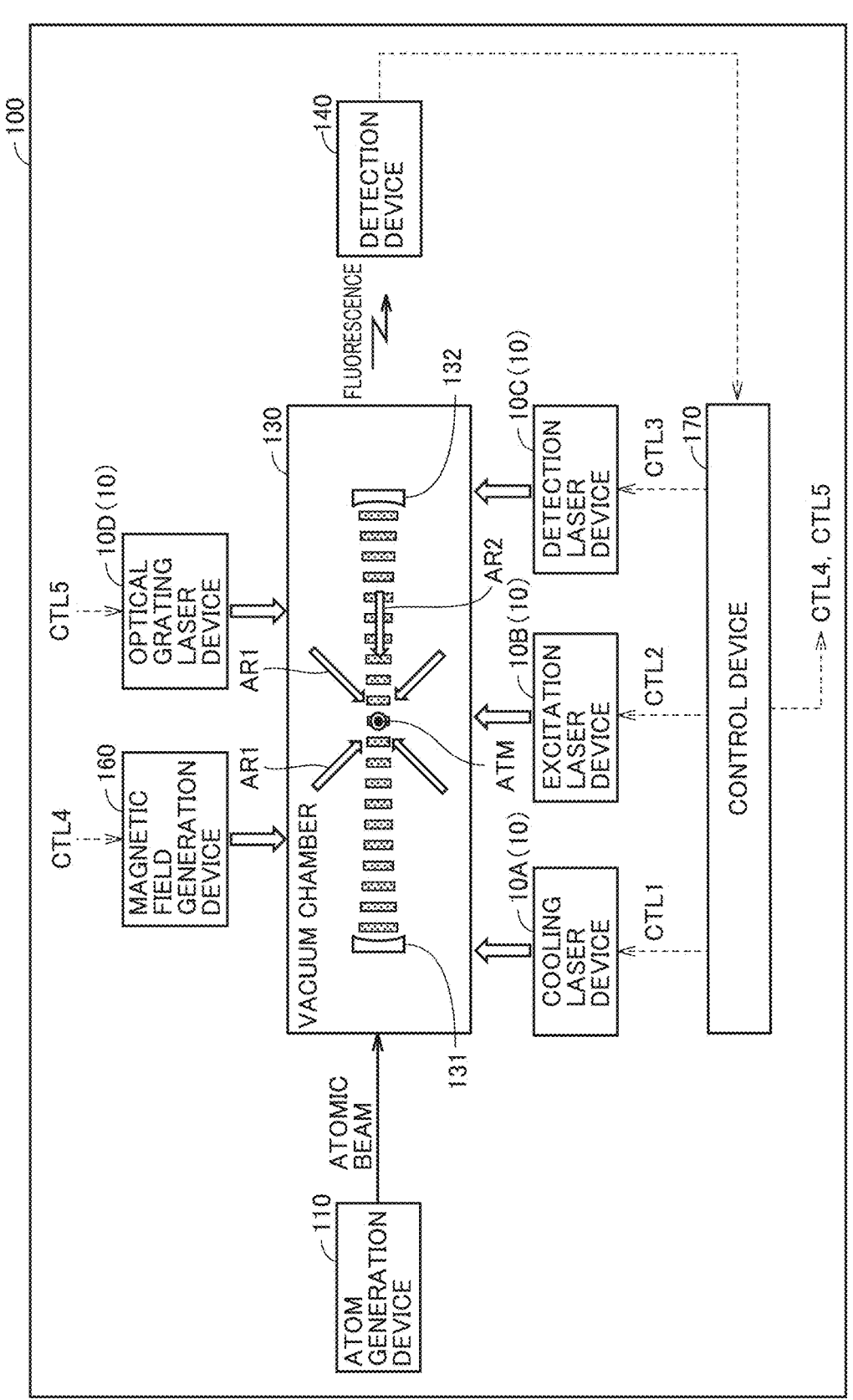
FIG. 2 is a block diagram showing a specific configuration of an optical grating clock.
Figure 3:
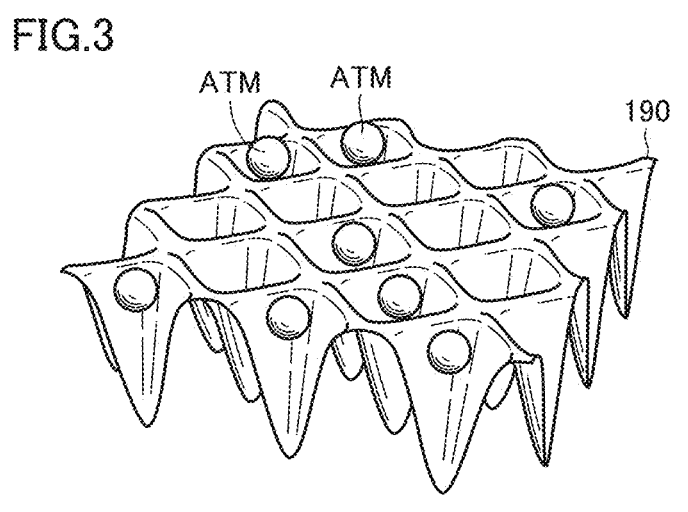

FIG. 2 is a block diagram showing a specific configuration of optical grating clock 100. FIG. 3 is a conceptual diagram of an optical grating 190. Referring to FIG. 2, optical grating clock 100 comprises an atom generation device 110, a vacuum chamber 130, a detection device 140, a plurality of laser devices 10, a magnetic field generation device 160, and a control device 170. The plurality of laser devices 10 include a cooling laser device 10A, an excitation laser device 10B, a detection laser device 10C, and an optical grating laser device 10D.

Atom generation device 110 includes a heating device (or an oven) (not shown), and heats a base material of atoms of strontium, ytterbium, mercury or the like in the oven. The heating cuts chemical bonds between the atoms and isolates the atoms, and thus generates a group of atoms (or an atomic gas). The heated and gasified atoms have high kinetic energy, and a high-velocity atomic gas is emitted from atom generation device 110 as an atomic beam. The atomic beam emitted from atom generation device 110 is guided into vacuum chamber 130.

Cooling laser device 10A is controlled by a control signal CTL1 received from control device 170. Cooling laser device 10A emits laser light to irradiate the atomic beam emitted from atom generation device 110 therewith in vacuum chamber 130 three-dimensionally (see arrows AR1 and AR2 in FIG. 2). When the cooling laser light is radiated in a direction opposite to that in which the atomic beam moves, the atoms' kinetic energy is reduced (i.e., cooled), and as a result, the atoms are reduced in velocity.

Vacuum chamber 130 is provided with a pair of opposed mirrors 131 and 132. Optical grating laser device 10D emits laser light between the opposing mirrors 131 and 132. Optical grating laser device 10D emits laser light controlled by a control signal CTL5 of control device 170 to have a specific wavelength (a magic wavelength), and a standing wave is generated by the laser light between mirror 131 and mirror 132.

Generally, an atom polarizes in an electric field and produces an induced dipole. The induced dipole interacts with the electric field. In a spatially non-uniform laser electric field, an electric potential with respect to an atom is minimum at a maximum of electric field intensity, and the atom is trapped at a location where the electric potential with respect to the atom is minimum.

When a standing wave of laser light is generated between mirrors 131 and 132, an atom is trapped at the position of an antinode of the standing wave. When standing waves are three-dimensionally combined together, an "optical grating" in which atoms are arranged at half-wavelength intervals is implemented. FIG. 3 conceptually shows an optical grating. Optical grating 190 generated by laser is conceptually a spatial interference fringe pattern in which recesses of electrical potential are formed at regular intervals, and atoms ATMs are trapped in the recesses.

When an atom has momentum (or velocity), the atom has a resonance frequency shifted by the Doppler effect, and time may be counted with reduced precision. Using the laser light of cooling laser device 10A to decelerate atoms ATMs in the atomic beam and using optical grating 190 as shown in FIG. 3 to capture atoms ATMs enable searching for the resonance frequency of the atom in a stationary state.

Magnetic field generation device 160 is controlled by a control signal CTL4 received from control device 170, and applies a magnetic field to moving atoms ATMs by passing a current through an electromagnetic coil (not shown) disposed in vacuum chamber 130 around mirrors 131 and 132. The applied magnetic field controls atoms ATMs in energy level and can implement a variety of types of atomic cooling.

Excitation laser device 10B is controlled by a control signal CTL2 received from control device 170. Excitation laser device 10B irradiates trapped atoms ATMs with pulsed laser light to excite energy transition of the atoms ATMs. An atom generally has a plurality of intrinsic energy levels. The atom has a property to selectively absorb a photon of a frequency having energy equivalent to an energy level difference in a transition between two different energy levels. A portion of the excitation laser light of excitation laser device 10B is output on path 410 (610) shown in FIG. 1 for frequency stabilization.

Detection laser device 10C is controlled by a control signal CTL3 received from control device 170. Detection laser device 10C irradiates atom ATM with laser light for detection after atom ATM has an energy level excited by excitation laser device 10B. The laser emitted from detection laser device 10C generates fluorescence having an intensity proportional to the atom's energy transition probability.

Detection device 140 receives the fluorescence generated by detection laser device 10C and detects the received fluorescence's intensity. Detection device 140 outputs to control device 170 a transition probability spectrum depending on an excitation laser frequency represented by the detected fluorescence intensity.

Control device 170 is configured to include, for example, a CPU (Central Processing Unit), a memory, and an input/output interface, none of which are shown, and integrally controls each device of optical grating clock 100. Control device 170 determines atom ATM's resonance frequency from the transition probability spectrum received from detection device 140. Control device 170 stabilizes the frequency of laser light emitted from excitation laser device 10B, based on a signal received on path 420 (620) shown in FIG. 1.

Figure 4:
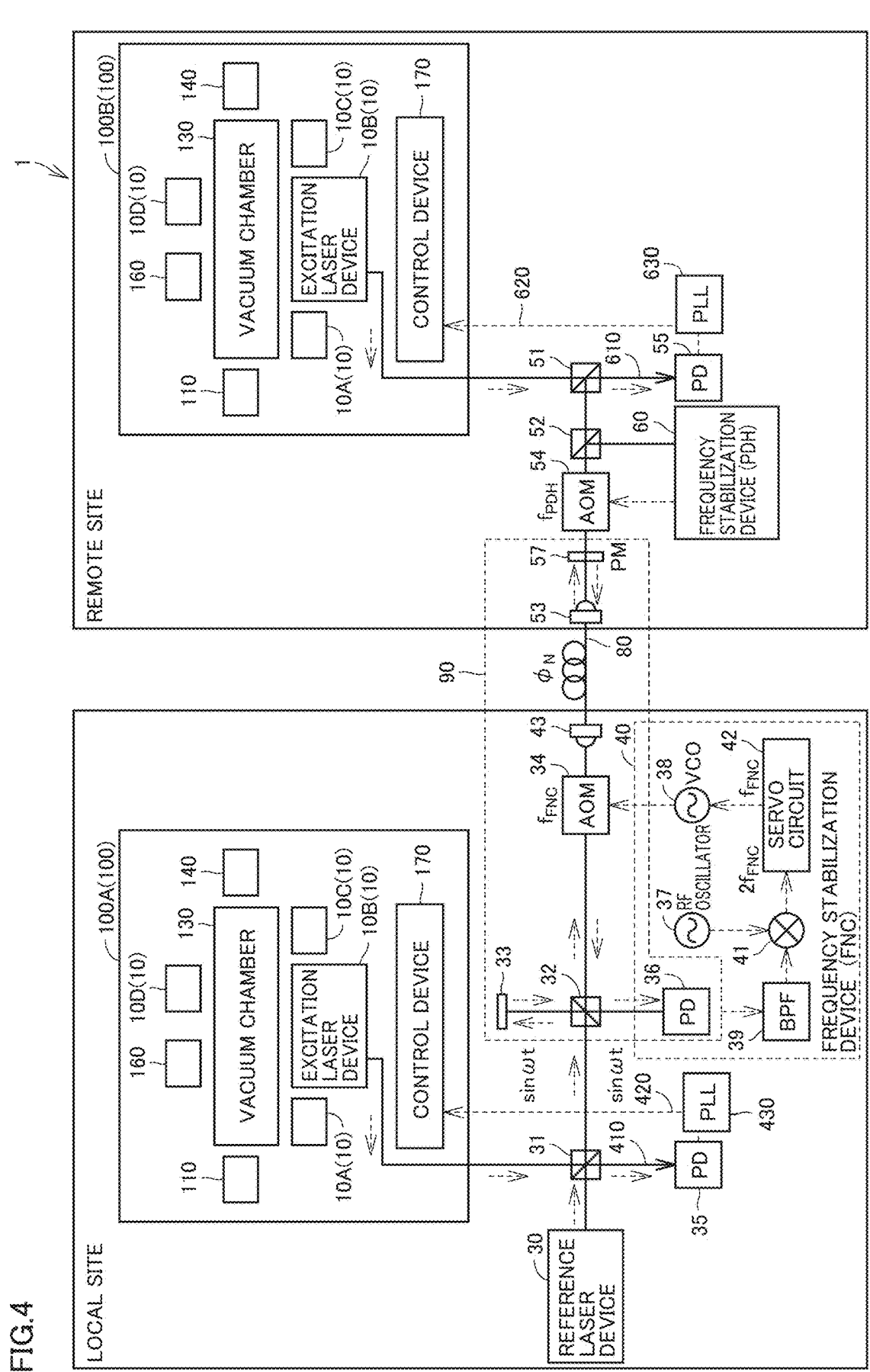
FIG. 4 is a block diagram showing a specific configuration of an optical grating clock and a specific configuration of a frequency stabilization device disposed at a local site in the block diagram shown in FIG. 1.

FIG. 4 is a block diagram showing a specific configuration of optical grating clock 100 (100A, 100B) and a specific configuration of frequency stabilization device 40 disposed at a local site in the block diagram shown in FIG. 1.

Optical grating clock 100 (100A, 100B) shown in FIG. 4 has a configuration corresponding to the configuration of optical grating clock 100 shown in FIG. 2. As has been described above, PLL circuit 430 provided on path 420 synchronizes the phase of the excitation laser light from optical grating clock 100A with the phase of the reference laser light by a phase locked loop. Similarly, PLL circuit 630 provided on path 620 synchronizes the phase of the excitation laser light from optical grating clock 100B with the phase of the laser light output from acousto-optic modulator 54 by a phase locked loop.

FIG. 4 shows that the excitation laser light output from excitation laser device 10B of optical grating clock 100A (100B) is input to photodiode 35 (55) via path 410 (610) and that a signal for stabilizing a beat frequency is input to control device 170 of optical grating clock 100 via path 420 (620).

As shown in FIG. 4, frequency stabilization device 40 disposed at the local site includes a local oscillator (RF oscillator) 37, a voltage-controlled oscillator (VCO) 38, a bandpass filter 39, a double balanced mixer 41, and a servo circuit 42.

In general, when laser light is transmitted through an optical fiber, fiber noise is superimposed on the laser light due to variation in optical path length as the optical fiber vibrates, expands and contracts, and the like. While fiber noise is not obtrusive to laser light which is not required to have a high degree of stability in frequency, an effect of fiber noise is no longer negligible when laser light having a narrow line width requiring a line width of several kHz or less is transmitted through an optical fiber, as described in the present embodiment. Frequency stabilization device 40 removes fiber noise by performing the following process based on the FNC method.

Frequency stabilization device 40 receives the reference laser light output from reference laser device 30 via beam splitters 31 and 32 and mirror 33. Note that it is assumed that the reference laser light is represented by "sin ωt". The reference laser light is detected by a photodiode 36.

Meanwhile, laser light input to acousto-optic modulator 34 via beam splitter 32 is modulated in acousto-optic modulator 34 with a frequency f, and subsequently coupled to optical fiber 80 at optical connector 43. When the laser light is transmitted through optical fiber 80, fiber noise of φN is superimposed on the laser light.

At the remote site, optical connector 53 outputs the laser light, which is in turn partially reflected by partial reflection mirror 57 and returns to optical fiber 80 as feedback light. Partial reflection mirror 57 is an example of a reflection mechanism. The feedback light passes through acousto-optic modulator 34 disposed at the local site, and thereafter, the feedback light is reflected by beam splitter 32 and detected by photodiode 36 together with the reference laser light. Photodiode 36 provides a detection signal which is in turn filtered by bandpass filter 39 and subsequently input to double balanced mixer 41.

Double balanced mixer 41 functions as a phase comparator that calculates a comparison value between the detection signal provided by photodiode 36 and a modulation signal received from local oscillator 37. From the detection signal and the modulation signal, double balanced mixer 41 detects a beat signal based on a difference between the reference laser light and the feedback light. The feedback light passes through optical fiber 80 and acousto-optic modulator 34 twice. Therefore, the beat signal is represented by $\sin(2ft\,30 - 2\varphi N)$. Double balanced mixer 41 inputs the beat signal to servo circuit 42. Servo circuit 42 executes control to cancel the component of φN, and outputs a feedback signal to acousto-optic modulator 34 via voltage-controlled oscillator 38.

This can remove fiber noise superimposed on laser light having a narrow line width when the laser light is transmitted through optical fiber 80. Thus, frequency stabilization device 40 configures a negative feedback circuit for removing fiber noise in the configuration of the local site of the atomic clock system. In other words, frequency stabilization device 40 is disposed to configure a negative feedback circuit on an optical path between reference laser device 30 and acousto-optic modulator 34.

As set forth above, when laser light is transmitted through an optical fiber over a long distance, a large delay time is introduced before the laser light returns from the remote site to the local site. Therefore, the FNC method can no longer cancel a high-frequency component of a noise. The FNC method is a method of cancelling fiber noise by obtaining information of a noise superimposed on feedback light, and performing phase modulation corresponding to the noise in acousto-optic modulator 34.

When laser light reciprocates through the optical fiber and accordingly the FNC requires a long period of time, a noise superimposed on the laser light at a time point when the laser light is emitted from the original laser source would vary between reference light immediately returned by beam splitter 32 and mirror 33 and the feedback light from the remote site.

That is, when the reference light is emitted from the laser source at time t1 and the feedback light is emitted from the laser source at time t2, and the former has a noise φ1 superimposed on the laser light when it is emitted and the latter has a noise φ2 superimposed on the laser light when it is emitted, then, φ1=φ2 can be considered for a short fiber length, that is, when two lights having their beats detected in photodiode 36 have t1≈t2. As the former and the latter have an originally superimposed noise in common, the originally superimposed noise is negligible in the FNC as a common mode, and only the noises superimposed through the optical fiber can be distinguished.

On the other hand, for a long fiber length, i.e., for t1>>t2, the former and the latter originally have mutually different noises superimposed on the laser light and whether a noise is a noise superimposed through the optical fiber or a noise originally superimposed on the laser light is no longer distinguishable and it is no longer possible to apply the FNC control only to the noise superimposed through the optical fiber.

When a laser of a narrow band width is individually used at each of a plurality of locations, it is unnecessary to have a laser light source at each location in common. In such a case, it is unnecessary to connect each location with an optical fiber, and the above-described problem does not arise. The above-described problem is not ignorable, however, for a case in which it is necessary to use a laser light source that is disposed at a local site and has a narrow line width as a master laser and distribute the master laser to a remote site distant from the local site, as in atomic clock system 1 according to the present embodiment.

Accordingly, in the present embodiment, frequency stabilization device 40 for removing fiber noise of reference laser light is disposed at a local site having a reference light source, and frequency stabilization device 60 for removing a noise of a high-frequency component of laser light is disposed at a remote site. Hereinafter, a specific configuration of frequency stabilization device 60 will be described with reference to FIG. 5.

Figure 5:
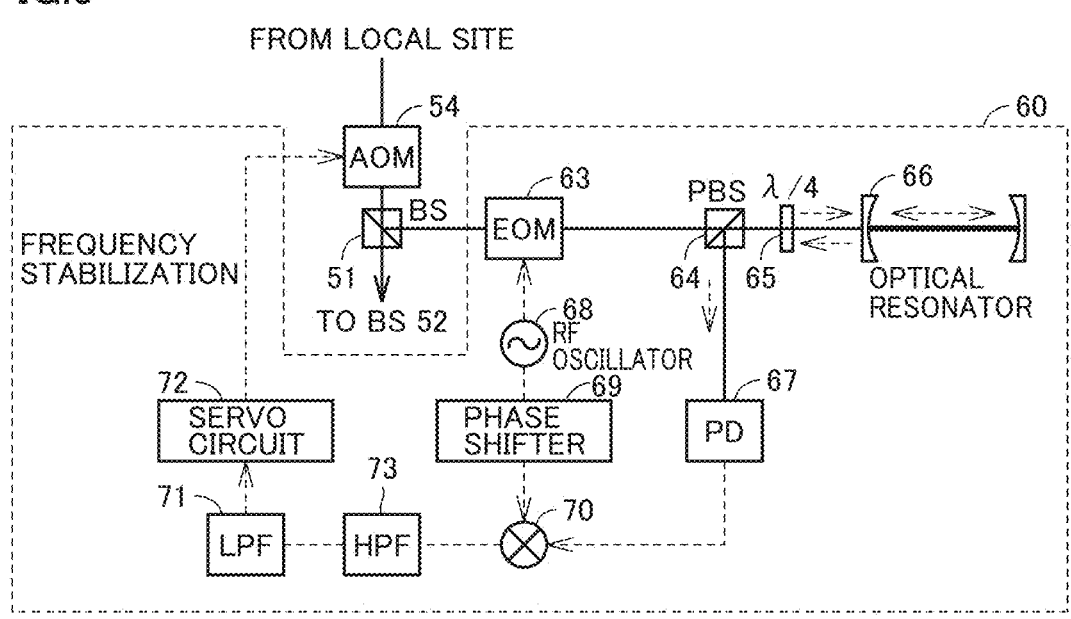
FIG. 5 is a block diagram showing a specific configuration of a frequency stabilization device disposed at a remote site.

FIG. 5 is a block diagram showing a specific configuration of frequency stabilization device 60 disposed at the remote site. Frequency stabilization device 60 includes an electro-optic modulator (EOM) 63, a polarizing beam splitter (PBS) 64, a ¼ wavelength plate 65, an optical resonator 66, a photodiode (PD) 67, a local oscillator (RF oscillator) 68, a phase shifter 69, a double balanced mixer 70, a low pass filter (LPF) 71, a high pass filter (HPF) 73, and a servo circuit 72.

A PDH method for stabilizing laser light in frequency with respect to the optical resonator is applied to frequency stabilization device 60. Accordingly, frequency stabilization device 60 includes a circuit configuration that operates based on the PDH method. It should be noted, however, that the circuit configuration includes high-pass filter 73 as a novel configuration that is not employed in a conventionally known PDH method. As shown in FIG. 5, high-pass filter 73 is disposed after double balanced mixer 70 and low-pass filter 71 and extracts a noise of a high-frequency component of laser light (an error signal including an error of the high-frequency component). As a result, in frequency stabilization device 60, a control based on the PDH method is implemented for the noise of the high-frequency component superimposed on the laser light.

One of two laser lights split by beam splitter 51 is input to electro-optic modulator 63 of frequency stabilization device 60. Note that beam splitter 51 receives laser light output from acousto-optic modulator 54. Acousto-optic modulator 54 is an example of an output device.

Electro-optic modulator 63 can electrically change a refractive index of light. Electro-optic modulator 63 modulates laser light in frequency and phase based on a modulation signal received from local oscillator 68. Electro-optic modulator 63 is an example of a phase modulation device using a modulation signal to modulate laser light in phase.

Polarizing beam splitter 64 allows a portion of incident laser light to pass therethrough, and reflects laser light that is returned via ¼ wavelength plate 65 in a direction substantially at a right angle. ¼ wavelength plate 65 changes a polarization state of laser light incident from polarizing beam splitter 64 and causes the thus changed laser light to be incident on optical resonator 66, and again changes a polarization state of laser light returned from optical resonator 66 and returns the again changed laser light to polarizing beam splitter 64.

Photodiode 67 detects a portion of laser light reflected by polarizing beam splitter 64. Photodiode 67 is an example of a photodetector. Photodiode 67 outputs an electrical signal corresponding to intensity of laser light. Local oscillator 68 functions as an oscillation device that outputs a modulation signal. Local oscillator 68 outputs the modulation signal to electro-optic modulator 63 and phase shifter 69.

Phase shifter 69 shifts a phase of the modulation signal transmitted from local oscillator 68. Double balanced mixer 70 calculates a comparison value between a detection signal detected by photodiode 67 and the modulation signal received from local oscillator 68. Double balanced mixer 70 is an example of a phase comparator. Double balanced mixer 70 calculates information of a difference in frequency between optical resonator 66 and the laser light, that is, a comparison value therebetween, based on the detection signal and the modulation signal.

Double balanced mixer 70 transmits the comparison value to high-pass filter 73. High-pass filter 73 extracts from the comparison value an error signal including an error of a high-frequency component. High-pass filter 73 is an example of a filter circuit. The error signal is passed through a low-pass filter 71. This removes from the error signal a component of a frequency higher than a target high-frequency component. The error signal having passed through low-pass filter 71 is used to remove a noise of a high-frequency component of the laser light.

Low-pass filter 71 and high-pass filter 73 may be replaced with a band-pass filter that allows only a target high-frequency component to pass therethrough.

Servo circuit 72 uses the error signal to adjust in frequency the laser light output from acousto-optic modulator 54. More specifically, servo circuit 72 executes feedback control for adjusting in frequency the laser light output from acousto-optic modulator 54 to the cavity length of optical resonator 66. Servo circuit 72 is an example of an adjustment circuit.

As described above, frequency stabilization device 60 is configured to stabilize laser light in frequency by causing phase-modulated laser light to be incident on optical resonator 66, detecting laser light that is output from optical resonator 66 by photodiode 67, and applying feedback based on the detected laser light.

This removes a noise of a high-frequency component of laser light output from acousto-optic modulator 54. Frequency stabilization device 60 configures a negative feedback circuit in a configuration on the side of a remote site of the atomic clock system for removing a noise of a high-frequency component that cannot be removed by frequency stabilization device 40 disposed at the local site. In other words, frequency stabilization device 60 is disposed to configure a negative feedback circuit on an optical path between acousto-optic modulator 54 and optical grating clock 100B.

As described above, atomic clock system 1 comprises reference laser device 30 and frequency stabilization device 40 disposed at a local site, and frequency stabilization device 60 disposed at a remote site. Atomic clock system 1 can stabilize laser light in frequency at the remote site while synchronizing the reference laser light at the local site and the laser light at the remote site. Thus, laser light synchronized with the local site can be obtained at the remote site.

Optical resonator 66 may provide performance and have a feedback band selected, as appropriate, in accordance with a length of optical fiber 80 necessary for transmitting laser light, and characteristics of an optical system of optical fiber 80. Generally, as laser light is transmitted through an optical fiber over a longer distance, the FNC is less effective for a noise of a high-frequency component. Accordingly, a feedback band for frequency stabilization using optical resonator 66 may be expanded to a low-frequency region depending on the distance of transmission of laser light.

First to Third Variations

Figure 6:
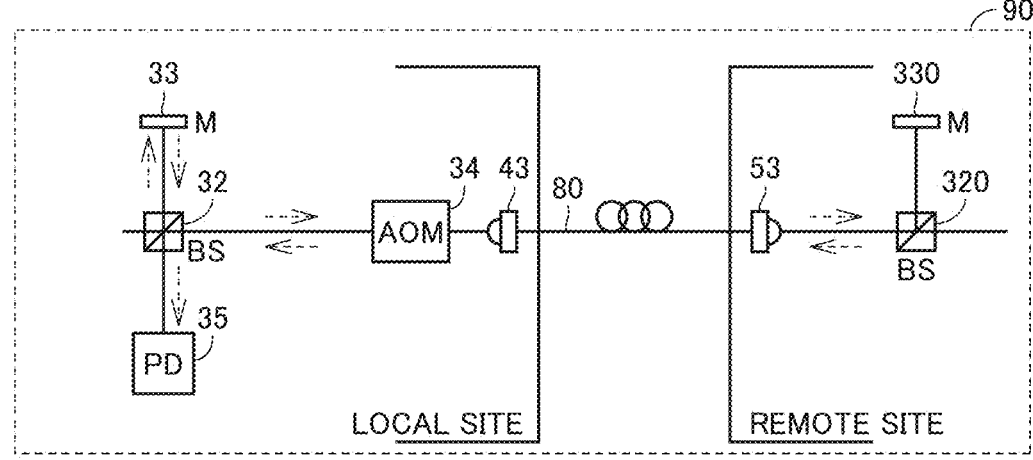
FIG. 6 is a block diagram illustrating a first variation.
Figure 7:
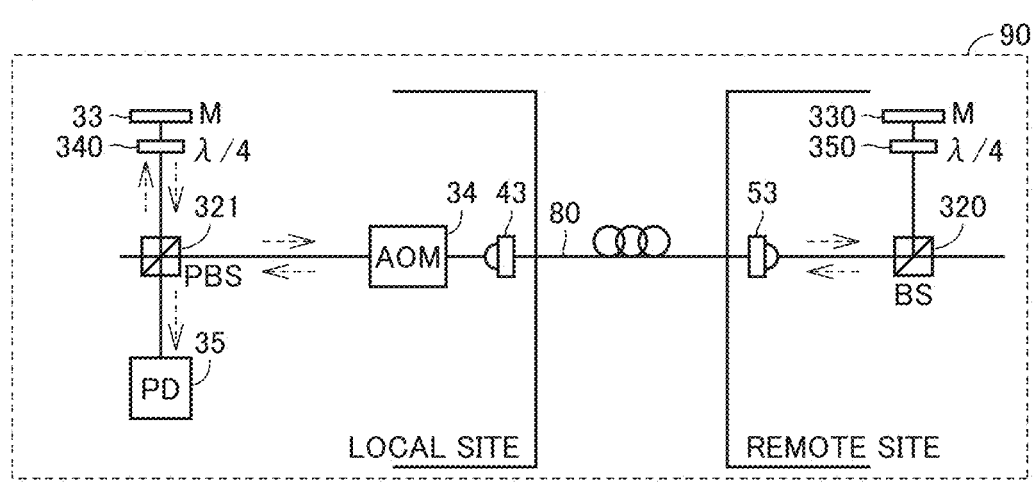
FIG. 7 is a block diagram illustrating a second variation.
Figure 8:
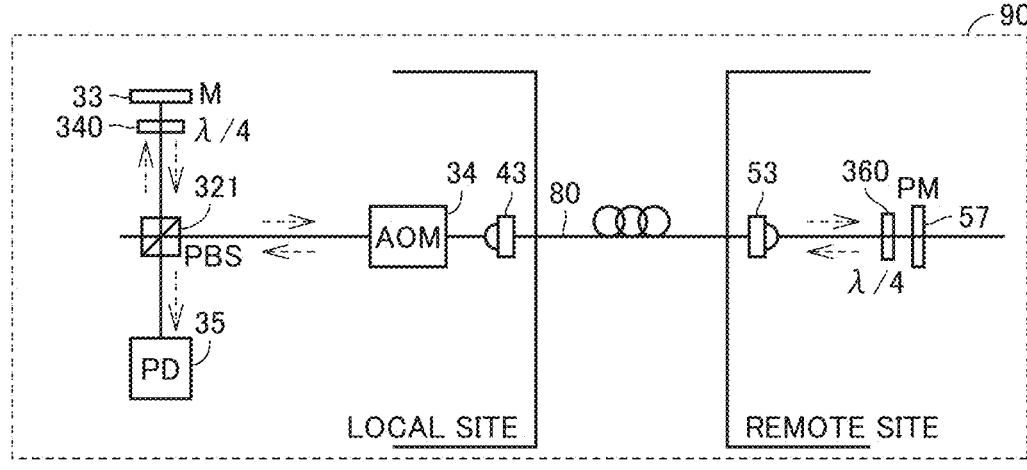
FIG. 8 is a block diagram illustrating a third variation.

Hereinafter, first, second and third variations of a circuit configuration 90 indicated by a broken line in atomic clock system 1 shown in FIG. 4 will be described. FIG. 6 is a block diagram illustrating the first variation. FIG. 7 is a block diagram illustrating the second variation. FIG. 8 is a block diagram illustrating the third variation.

In the first variation is adopted circuit configuration 90 shown in FIG. 4 having the remote site's partial reflection mirror 57 replaced with a beam splitter 320 and a mirror 330 in combination.

In the second variation is adopted circuit configuration 90 shown in FIG. 4 having the local site's beam splitter 32 and mirror 33 in combination replaced with a polarizing beam splitter 321, a ¼ wavelength plate 340, and mirror 33 in combination. In the second variation is further adopted circuit configuration 90 shown in FIG. 4 having the remote site's partial reflection mirror 57 replaced with beam splitter 320, a ¼ wavelength plate 350, and mirror 330 in combination.

In the third variation is adopted circuit configuration 90 shown in FIG. 4 having the local site's beam splitter 32 and mirror 33 in combination replaced with polarizing beam splitter 321, ¼ wavelength plate 340, and mirror 33 in combination. In this respect, the third variation is identical to the second variation. In the third variation is further adopted circuit configuration 90 shown in FIG. 4 having the remote site's partial reflection mirror 57 replaced with a ¼ wavelength plate 360 and partial reflection mirror 57 in combination.

Circuit configuration 90 shown in FIG. 4 receives reference laser light output from reference laser device 30, splits the received reference laser light by beam splitter 32 into laser light directed to the remote site and laser light directed to frequency stabilization device 40, combines feedback light returned from the remote site and the reference laser light output from reference laser device 30 together by beam splitter 32, and outputs the combined laser light to photodiode 36. Circuit configuration 90 shown in FIG. 4 can reduce the number of components required for the local and remote sites.

Circuit configuration 90 shown in FIG. 4, however, may have an increased optical power loss as beam splitter 32 fixes a ratio of splitting laser light. When this configuration is compared with the second and third variations, the latter has polarizing beam splitter 321 and ¼ wavelength plate 340 in combination, and can reduce optical power loss.

Circuit configuration 90 shown in FIG. 4 employs partial reflection mirror 57 in order to return a portion of laser light from the remote site to the local site. Alternatively, partial reflection mirror 57 may be replaced with beam splitter 320 to split laser light, and mirror 330 to subsequently return one of the two split laser lights, as in the first and second variations, in order to return a portion of laser light from the remote site to the local site.

<Application to Other Atomic Clocks>

In the above embodiment, an optical grating clock has been described as an example of an atomic clock. However, the present disclosure is also applicable to other types of atomic clocks other than optical grating clocks. For example, any atomic clock such as an atomic fountain type microwave atomic clock, an atomic beam type microwave atomic clock, and a photoionic clock may be applied to atomic clock system 1.

ASPECTS

It is understood by those skilled in the art that the above-described embodiment and its variations are specific examples of the following aspects.

(Clause 1) According to an aspect, an atomic clock system comprises: a laser light source that outputs first laser light; a first atomic clock that operates using the first laser light; a first optical modulator that receives the first laser light; a second optical modulator that receives laser light from the first optical modulator through an optical fiber; a reflection mechanism that is disposed on an optical path between the optical fiber and the second optical modulator, and reflects a portion of laser light traveling through the optical fiber toward the second optical modulator to return the portion of the laser light to the optical fiber as feedback light; a second atomic clock that operates using second laser light output from the second optical modulator; a first frequency stabilization device disposed to configure a negative feedback circuit on an optical path between the laser light source and the first optical modulator; and a second frequency stabilization device disposed to configure a negative feedback circuit on an optical path between the second optical modulator and the second atomic clock, wherein the first frequency stabilization device uses the first laser light and the feedback light to remove fiber noise superimposed on the first laser light, and the second frequency stabilization device removes a noise of a high-frequency component superimposed on the second laser light.

The atomic clock system according to clause 1 can synchronize the first laser light and the second laser light, and allows time to be observed suitably in an scene in which a plurality of atomic clocks connected by an optical fiber are used to observe time.

(Clause 2) The atomic clock system according to clause 1, wherein the first frequency stabilization device removes the fiber noise based on a method of fiber noise cancellation (FNC).

The atomic clock system according to clause 2 can stabilize the first laser light in frequency.

(Clause 3) The atomic clock system according to clause 1 or 2, wherein the second frequency stabilization device includes a circuit configuration that operates based on a Pound-Drever-Hall (PDH) method, and the circuit configuration includes a filter circuit that extracts an error signal including an error of the high-frequency component of the second laser light, and an adjustment circuit that adjusts the second laser light in frequency using the error signal extracted by the filter circuit.

The atomic clock system according to clause 3 can stabilize the second laser light in frequency.

(Clause 4) The atomic clock system according to any one of clauses 1 to 3, wherein the first atomic clock and the second atomic clock each include a vacuum chamber, an atom generation device that emits an atomic beam to the vacuum chamber, a laser device that excites a transition between energy levels of an atom by irradiating the vacuum chamber with laser light while the atom generation device emits the atomic beam, a detection device that detects optical intensity proportional to an energy transition probability of the atom in the vacuum chamber, and a control device that determines, based on the optical intensity detected by the detection device, a frequency of laser light emitted by the laser device, and the atomic clock system comprises a first PLL circuit that synchronizes a phase of laser light emitted from the laser device of the first atomic clock with a phase of the first laser light by a phase locked loop based on the first laser light and the laser light emitted from the laser device of the first atomic clock, and a second PLL circuit that synchronizes a phase of laser light emitted from the laser device of the second atomic clock with a phase of the second laser light by a phase locked loop based on the second laser light and the laser light emitted from the laser device of the second atomic clock.

The atomic clock system according to clause 4 can synchronize the third laser light of the first atomic clock and the third laser light of the second atomic clock.

(Clause 5) According to another aspect, a frequency stabilization device that stabilizes a frequency of laser light output from an output device comprises: a phase modulation device that modulates a phase of the laser light output from the output device using a modulation signal; an optical resonator that resonates the laser light modulated by the phase modulation device; a photodetector that detects laser light output from the optical resonator; a phase comparator that calculates a comparison value between a detection signal of the photodetector and the modulation signal; a filter circuit that extracts an error signal including an error of a high-frequency component from the comparison value; and an adjustment circuit that uses the error signal extracted by the filter circuit to adjust the frequency of the laser light output from the output device.

The frequency stabilization device according to clause 5 can remove a noise of a high-frequency component of laser light at a remote site where laser light output from a laser light source is received via an optical fiber.

While an embodiment of the present invention has been described, it should be understood that the presently disclosed embodiment has been described for the purpose of illustration only and in a non-restrictive manner in any respect. The scope of the present invention is defined by the terms of the claims, rather than the above description, and is intended to encompass any modifications within the meaning and scope equivalent to the terms of the claims.

What is claimed is:

1. An atomic clock system comprising:
a laser light source that outputs first laser light;
a first atomic clock that operates using the first laser light;
a first optical modulator that receives the first laser light;
a second optical modulator that receives laser light from the first optical modulator through an optical fiber;
a reflection mechanism that is disposed on an optical path between the optical fiber and the second optical modulator, and reflects a portion of laser light traveling through the optical fiber toward the second optical modulator to return the portion of the laser light to the optical fiber as feedback light;
a second atomic clock that operates using second laser light output from the second optical modulator;
a first frequency stabilization device disposed to configure a negative feedback circuit on an optical path between the laser light source and the first optical modulator; and
a second frequency stabilization device disposed to configure a negative feedback circuit on an optical path between the second optical modulator and the second atomic clock, wherein
the first frequency stabilization device uses the first laser light and the feedback light to remove fiber noise superimposed on the first laser light, and
the second frequency stabilization device removes a noise of a high-frequency component superimposed on the second laser light.

2. The atomic clock system according to claim 1, wherein the first frequency stabilization device removes the fiber noise based on a method of fiber noise cancellation (FNC).

3. The atomic clock system according to claim 1, wherein the second frequency stabilization device includes a circuit configuration that operates based on a Pound-Drever-Hall (PDH) method, and
the circuit configuration includes
a filter circuit that extracts an error signal including an error of the high-frequency component of the second laser light, and
an adjustment circuit that adjusts the second laser light in frequency using the error signal extracted by the filter circuit.

4. The atomic clock system according to claim 1, wherein the first atomic clock and the second atomic clock each include
a vacuum chamber,
an atom generation device that emits an atomic beam to the vacuum chamber,
a laser device that excites a transition between energy levels of an atom by irradiating the vacuum chamber with laser light while the atom generation device emits the atomic beam,
a detection device that detects optical intensity proportional to an energy transition probability of the atom in the vacuum chamber, and
a control device that determines, based on the optical intensity detected by the detection device, a frequency of laser light emitted by the laser device, and
the atomic clock system further comprises
a first PLL circuit that synchronizes a phase of laser light emitted from the laser device of the first atomic clock with a phase of the first laser light by a phase locked loop based on the first laser light and the laser light emitted from the laser device of the first atomic clock, and
a second PLL circuit that synchronizes a phase of laser light emitted from the laser device of the second atomic clock with a phase of the second laser light by a phase locked loop based on the second laser light and the laser light emitted from the laser device of the second atomic clock.

5. A frequency stabilization device that stabilizes a frequency of laser light output from an output device, comprising:
a phase modulation device that modulates a phase of the laser light output from the output device using a modulation signal;

an optical resonator that resonates the laser light modulated by the phase modulation device;

a photodetector that detects laser light output from the optical resonator;

a phase comparator that calculates a comparison value between a detection signal of the photodetector and the modulation signal;

a filter circuit that extracts an error signal including an error of a high-frequency component from the comparison value; and an adjustment circuit that uses the error signal extracted by the filter circuit to adjust the frequency of the laser light output from the output device.

* * * * *